United States Patent

[11] 3,598,102

[72] Inventor Edward Gary Fuss
535 Grove St., Mayville, Wis. 53050
[21] Appl. No. 861,844
[22] Filed Sept. 29, 1969
[45] Patented Aug. 10, 1971

[54] ATTACHMENTS FOR OUTDOOR GRILLS
4 Claims, 6 Drawing Figs.
[52] U.S. Cl. .................................................. 126/25, 99/446
[51] Int. Cl. ........................................................ A47j37/07
[50] Field of Search............................................ 99/446, 339—40, 346, 421, 421 H, 443, 444—445, 428; 126/25, 25 A; 431/292

[56] References Cited
UNITED STATES PATENTS

| | | | |
|---|---|---|---|
| 1,073,013 | 9/1913 | Andres .......................... | 431/292 |
| 1,640,734 | 8/1927 | Smith ........................... | 431/292 |
| 1,332,251 | 3/1920 | Gatchell ....................... | 99/450 X |
| 2,950,712 | 8/1960 | Terry ............................ | 126/25 A |
| 2,996,597 | 8/1961 | Persinger et al. ............ | 99/443 UX |
| 3,132,639 | 5/1964 | Roberts ........................ | 126/25 |
| 3,217,634 | 11/1965 | Fox ............................... | 99/339 |
| 3,316,892 | 5/1967 | Hanke .......................... | 126/25 |

Primary Examiner—Walter A. Scheel
Assistant Examiner—Arthur O. Henderson
Attorney—Wheeler, House and Wheeler ABSTRACT: A fuel container is provided for an outdoor grill in the form of a pan with a central aperture defined by an upstanding annular flange which receives the grill supporting shaft. The fuel container is provided with handles and a hinged sieve plate, which can be secured in a position partially enclosing the upwardly open fuel container to prevent loss of fuel when tilting the fuel container to facilitate the drainage of water used to extinguish the coals. Also disclosed is a grease receptacle which is adapted to be placed under a circular wire grill and which comprises two semicircular arrays of parallel spaced troughs. The inner ends of the troughs are connected to a rectangular wire frame which is secured to a central hub which is supported by a shoulder on the grill supporting shaft. The troughs are spaced at a center to center distance equal to the distance between adjacent grill wires. The troughs are inclined downwardly from the rectangular frame and terminate at and drain into an outer ring which has an upwardly open annular channel which surrounds the troughs and forms a common reservoir.

PATENTED AUG 10 1971
3,598,102
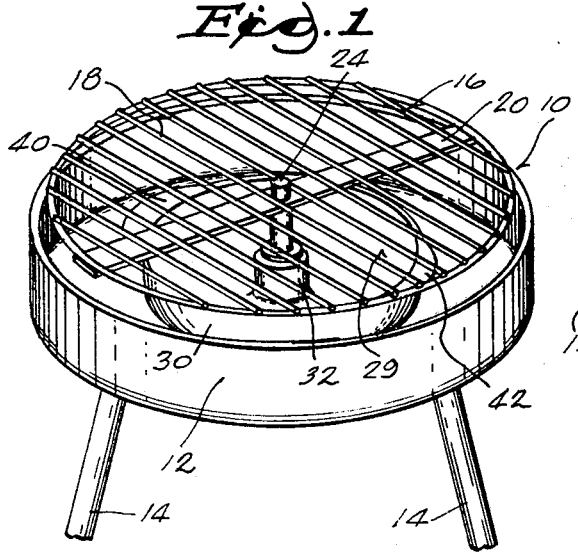
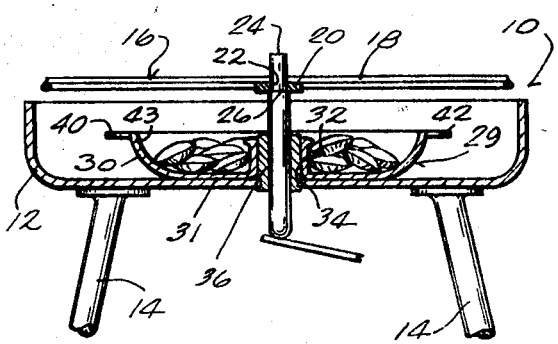
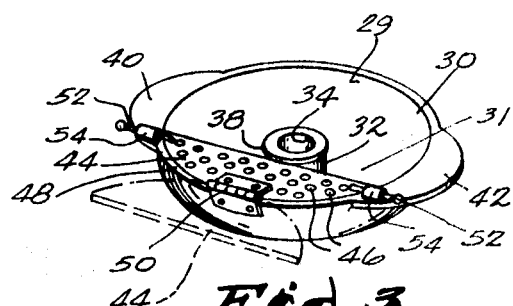
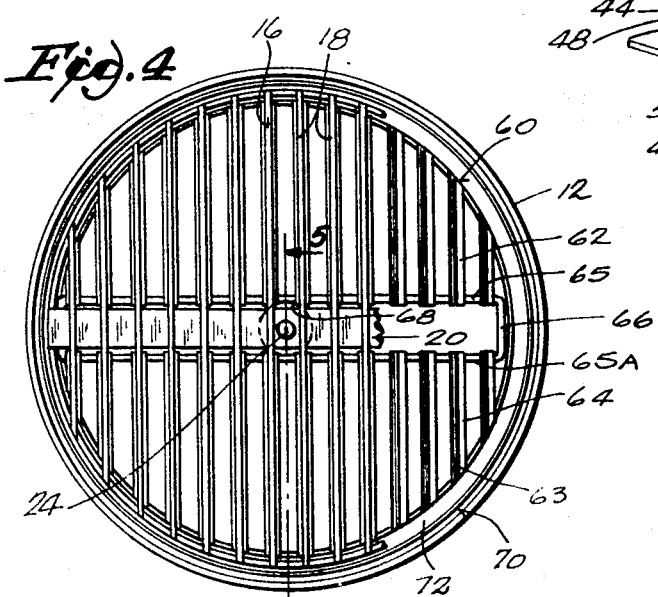
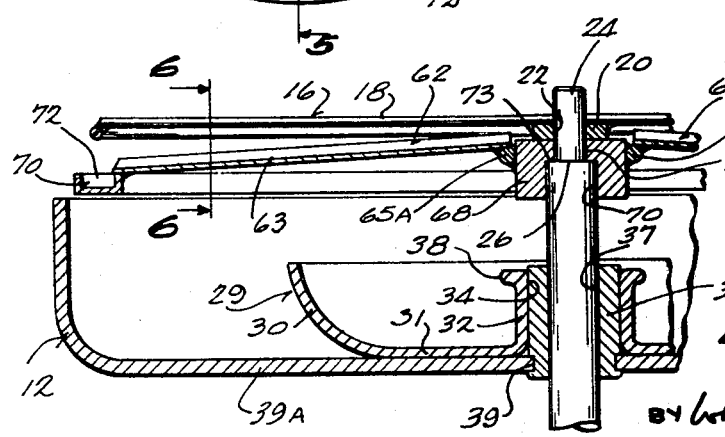
INVENTOR
EDWARD GARY FUSS
BY Wheeler, Wheeler, Horner & Clemency
ATTORNEYS 3,598,102

1

ATTACHMENTS FOR OUTDOOR GRILLS

CROSS-REFERENCE TO RELATED APPLICATION

This application is a further development of the subject matter disclosed in application Ser. No. 736,489, now abandoned.

BACKGROUND OF INVENTION

The invention relates to a portable outdoor barbeque apparatus and more particularly to an improved fuel container and grease receptacle therefor.

SUMMARY OF INVENTION

The invention provides a be swung
adapted to be centrally located within container bo vl of an outdoor grill or brazier to facilitate the use of small am >unts of fuel to provide economy in operation and provide a c ntainer for storing fuel for later reuse. More specifically, the 1 1el container is in the form of a shallow pan with an upstandii g annular flange which defines an aperture which rece ves the mounting sleeve and grill supporting shaft. The up standing flange keeps the fuel from escaping through the aperture and thus permits preloading of the receptacle before the receptacle is installed in the grill.

The fuel receptacle is provided with a pair of oppositely located handles on the outer rim of the bowl to facilitate carrying the receptacle and for tilting the receptacle to drain water which was used to extinguish the coals. To prevent loss of fuel when tilting the container to drain water, the receptacle is provided with a sieve plate which is in the form of a perforated circular segment which is hinged to the rim of the fuel container. When in use for drainage purposes, the sieve plate is retained in a position partially enclosing the container by a pair of slides mounted on the handles. When the fuel container is in use for grilling, the sieve plate can be swung to a displaced position outwardly of the container so that it will not interfere with heat transfer from the fuel to the wire grill.

The invention also provides a grease receptacle to minimize the quantity of grease reaching the fuel. The grease receptacle is located under the wire grill. In one embodiment the grease receptacle comprises two semicircular arrays of parallel spaced troughs. Each array is inclined downwardly and outwardly from a frame carried by a central hub which is supported on a shoulder of the grill supporting shaft. The frame is rectangular in form and the inner ends of the individual grease troughs are secured to the frame. The outer ends of the grease troughs for both semicircular arrays are connected to a ring which has an upwardly open annular channel which receives the grease carried by the troughs. The grease receptacle can be easily detached from the grill supporting shaft when it is not in use.

It is an object of the invention to provide a small fuel container to provide economical use of fuel and which includes handles located on the rim of the receptacle and a hinged sieve plate which facilitates drainage of water from the fuel container.

It is a further object of the invention to provide a grease receptacle which is easily installed and removed from a grill and is particularly adapted for use with a circular grill. Further objects and advantages of the present invention will become apparent from the following disclosure.

THE DRAWINGS

FIG. 1 is a fragmentary perspective view of an outdoor barbeque grill including the fuel container of the invention.

FIG. 2 is a fragmentary sectional view of the grill and fuel container shown in FIG. 1.

FIG. 3 is a modified embodiment of the fuel container shown in FIGS. 1 and 2.

FIG. 4 is a plan view of a grease receptacle in accordance with the invention.

FIG. 5 is an enlarged fragmentary sectional view along line 5-5 of FIG. 4.

FIG. 6 is a sectional view along line 6-6 of FIG. 5.

DETAILED DESCRIPTION

Although the disclosure thereof is detailed and exact to enable those skilled in the art to practice the invention, the physical embodiments herein disclosed merely exemplify the invention which may be embodied in other specific structures. The scope of the invention is defined in the claims appended hereto.

In the drawings, FIG. 1 discloses an outdoor grill or brazier which is generally designated 10 and which includes a combustion chamber 12 which is supported by legs 14. The brazier is provided with a wire grill 16 which includes a plurality of parallel spaced grill wires 18 which are supported on a plate 20 which is provided with an aperture 22 to receive a grill supporting shaft 24. The plate 22 is supported by a shoulder 26 on the grill supporting shaft. Any conventional arrangement can be employed to vary the height of the grill.

In accordance with the invention there is provided a fuel container 29 in the form of a shallow annular pan 30. The receptacle 29 includes an upstanding annular flange 32 which extends from the bottom 31 of the container 29 and which defines an aperture 34 which receives a sleeve 36 having a bore 37. The sleeve 36 extends from an aperture 39 in the bottom wall 39A of the combustion chamber 12 (FIG. 5). The sleeve 36 supports the shaft 24. The annular flange 32 can be provided with an out-turned lip 38. The annular flange 32 interfits with the sleeve 36 to prevent escape or loss of fuel from the combustion chamber 12. The annular flange 32 also permits preloading of the container 29 with fuel before the container 29 is installed in the combustion chamber 12.

The fuel container 29 can also be provided with out-turned flanges or handles 40 and 42 on the container sidewall 43.

FIG. 3 shows a further embodiment of the fuel container 29 which includes a sieve plate 44 in the form of a circular segment with a plurality of apertures or perforations 46. The sieve plate is pivotally connected to the rim 48 of the container 29 by a hinge 50.

Means can also be provided to secure the sieve plate 44 in a first position partially enclosing the fuel container 29 as shown in solid lines in FIG. 3. As disclosed, the means is in the form of a pair of slides or pins 52 which are reciprocally disposed in sleeves 54 which are welded or otherwise secured to the handles 40 and 42. The sieve plate 44 is employed to prevent loss of fuel when draining water from the container 29 which was used to extinguish the coals for later use. When the container 29 is tilted to drain water, the pins 52 prevent pivoting of the sieve plate about the hinge 50. When the fuel container 29 is in use in the combustion chamber 12, the sieve plate 44 can be moved outwardly to a second position shown in broken lines in FIG. 3.

The invention also provides a grease receptacle 60 (FIGS. 4, 5 and 6). The grease receptacle 60 comprises two semicircular arrays 62 and 64 of parallel, spaced U-shaped or V-shaped troughs 63. When supported as hereinafter described, the semicircular arrays 62 and 64 form a downwardly open oblique angle. The inner ends of the troughs 63 are connected to the legs 65 and 65A of a rectangular wire frame 66 which is secured to a central hub 68 which has an aperture 70 and counterbore 72. The bottom 73 of the counterbore 72 is supported on the shoulder 26 of the shaft 24. As shown in FIG. 5, the semicircular arrays 62 and 64 are inclined downwardly and outwardly from the hub.

In accordance with the invention, means are provided for defining a common reservoir interconnecting the outer ends of the troughs. As disclosed, the means is in the form of a ring 70 which is connected to the outer ends of the troughs 63 and which has an upwardly open annular channel 72 which receives the grease form the troughs 63. The troughs 63 are desirably spaced so that the centers of the troughs 63 are vertically below the grill wires 18 as shown in FIG. 6 when the grill 16 is properly oriented over the grease receptacle 60.

What I claim is:

1. A fuel container for an outdoor barbeque grill comprising a pan having a sidewall and including a sieve plate having a plurality of apertures, said plate being pivotally connected to said sidewall to afford use of said plate in a first position partially enclosing said container and in a second position displaced outwardly of said container.

2. A fuel container in accordance with claim 1, including means for securing said sieve plate in said first position partially enclosing said container.

3. The fuel container in accordance with claim 3 wherein said means for securing said plate in said first position comprise a slide handles on said sidewall and means on one of said handles for supporting said slide for movement over said plate.

4. A barbeque grill comprising a pan having a bottom wall, an upstanding annular flange extending from said bottom wall and defining a central aperture adapted to receive a grill supporting shaft and a combustion chamber having a bottom wall, an upwardly extending sleeve in said aperture in said combustion chamber bottom wall, said sleeve being adapted to receive a grill supporting shaft and interfit with said annular flange on said fuel container to prevent loss of fuel from said container through said aperture in said combustion chamber bottom wall.

UNITED STATES PATENT OFFICE
CERTIFICATE OF CORRECTION

Patent No. 3,598,102         Dated August 10, 1971

Inventor(s)  Edward Gary Fuss

It is certified that error appears in the above-identified patent and that said Letters Patent are hereby corrected as shown below:

Column 1, Line 16, delete "be swung" from the sentence and insert fuel container after the word -a-

Column 1, Line 17, "container" should read -----the----

Column 2, Line 6, "thereof" should read ----hereof----

Column 2, Line 18, insert (Fig. 2) after -26-

Column 3, Line 13, change "claim 3" to "claim 2"

Column 4, Line 1, "comprise" should read --comprises--

Signed and sealed this 29th day of February 1972.

(SEAL)
Attest:

EDWARD M. FLETCHER, JR.         ROBERT GOTTSCHALK
Attesting Officer                Commissioner of Patents